United States Patent
Xiao et al.

(10) Patent No.: US 12,037,061 B2
(45) Date of Patent: Jul. 16, 2024

(54) LATERAL MOTION CONTROL FOR VEHICLE, AUTOMATIC DRIVING CONTROLLER, STEERING SYSTEM, VEHICLE, AND STORAGE MEDIUM

(71) Applicant: NIO TECHNOLOGY (ANHUI) CO., LTD, Hefei (CN)

(72) Inventors: Bohong Xiao, Shanghai (CN); Da Yuan, Shanghai (CN); Chao Xu, Shanghai (CN); Qiang Wei, Shanghai (CN); Baotian Wang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 12 days.

(21) Appl. No.: 17/748,209

(22) Filed: May 19, 2022

(65) Prior Publication Data
US 2022/0371654 A1    Nov. 24, 2022

(30) Foreign Application Priority Data
May 20, 2021    (CN) .......................... 202110551463.7

(51) Int. Cl.
*B62D 5/04* (2006.01)
*B62D 6/02* (2006.01)

(52) U.S. Cl.
CPC ......... *B62D 5/0484* (2013.01); *B62D 5/0493* (2013.01); *B62D 6/02* (2013.01)

(58) Field of Classification Search
CPC .. B62D 1/286; B62D 15/025; B62D 15/0265; B62D 15/027; B62D 5/0463; B62D 5/0481; B62D 6/00; B62D 6/002
See application file for complete search history.

(56) References Cited

U.S. PATENT DOCUMENTS

| | | | |
|---|---|---|---|
| 11,427,253 B2* | 8/2022 | Riikonen | B60W 50/087 |
| 11,526,368 B2* | 12/2022 | Karashchuk | G06Q 10/109 |

(Continued)

FOREIGN PATENT DOCUMENTS

| | | |
|---|---|---|
| CN | 109415089 | 3/2019 |
| CN | 110155031 | 8/2019 |

(Continued)

OTHER PUBLICATIONS

Extended Search Report for European Patent Application No. 22165481.7, dated Sep. 13, 2022, 19 pages.

(Continued)

*Primary Examiner* — Redhwan K Mawari
(74) *Attorney, Agent, or Firm* — Sheridan Ross P.C.

(57) ABSTRACT

The application relates to a lateral motion control method and system for a vehicle, an automatic driving controller, a steering system, a vehicle, and a storage medium, wherein the lateral motion control method for the vehicle comprises: generating and outputting a steering control command according to a desired track of the vehicle, such that the vehicle moves along an actual track according to the steering control command; determining a vehicle running state, wherein the vehicle running state is generated according to an error value between the desired track and the actual track; and determining whether to stop/limit outputting of the steering control command or not according to the vehicle running state. The lateral motion of the vehicle can be controlled according to the method.

9 Claims, 3 Drawing Sheets

(56) References Cited

U.S. PATENT DOCUMENTS

| | | | |
|---|---|---|---|
| 11,532,306 B2* | 12/2022 | Kim | H04R 1/406 |
| 11,538,469 B2* | 12/2022 | Acero | G10L 15/30 |
| 2004/0254720 A1* | 12/2004 | Tanaka | B62D 15/027 |
| | | | 701/36 |
| 2014/0232570 A1* | 8/2014 | Skinder | G01C 21/20 |
| | | | 340/989 |
| 2017/0091496 A1* | 3/2017 | Nevarez Pedroza | |
| | | | G06Q 10/0833 |
| 2017/0115662 A1 | 4/2017 | Mori et al. | |
| 2018/0304918 A1* | 10/2018 | Kunihiro | B62D 5/0463 |
| 2019/0315399 A1* | 10/2019 | Yamamoto | B62D 6/002 |
| 2019/0367092 A1* | 12/2019 | Heo | B62D 15/025 |
| 2020/0114951 A1* | 4/2020 | Kim | B62D 5/0463 |
| 2021/0061349 A1* | 3/2021 | Leydier | B62D 6/00 |

FOREIGN PATENT DOCUMENTS

| | | |
|---|---|---|
| CN | 110576850 | 12/2019 |
| CN | 112440979 | 3/2021 |
| EP | 1462312 | 9/2004 |
| EP | 3730384 | 10/2020 |
| WO | WO 2020/043366 | 3/2020 |

OTHER PUBLICATIONS

Official Action for European Patent Application No. 22165481.7, dated Jun. 15, 2023, 4 pages.
Official Action with Machine Translation for China Patent Application No. 202110551463.7, dated May 31, 2024, 14 pages.

* cited by examiner

LATERAL MOTION CONTROL FOR VEHICLE, AUTOMATIC DRIVING CONTROLLER, STEERING SYSTEM, VEHICLE, AND STORAGE MEDIUM

CROSS-REFERENCE TO RELATED APPLICATION

This application claims the benefit of China Patent Application No. 202110551463.7 filed May 20, 2021, the entire contents of which are incorporated herein by reference in its entirety.

TECHNICAL FIELD

The application relates to the field of vehicle control, and in particular to a lateral motion control method for a vehicle, a lateral motion control system for a vehicle, an automatic driving controller, a steering system, a vehicle, and a computer readable storage medium.

BACKGROUND ART

At present, there is an increasing demand for automatic/aided driving, and the research in this field is also simultaneously performed from different dimensions. As an aspect of vehicle control safety, lateral motion control for a vehicle is critical to vehicle driving safety. In a traditional solution, the way of limiting a steering change rate is used to avoid an unexpected steering command. However, this way heavily relies on an initially set judgment criterion for defining a normal/abnormal steering command. This way of setting the criterion in advance is relatively inflexible and cannot accurately reflect the actual condition during vehicle driving. In the other aspect, the initially set judgment criterion will limit the lateral movement of the vehicle such that it is no longer possible to get out of danger by a lateral maneuvering operation, such as in case of emergency. In view of this, a more flexible and efficient lateral motion control mechanism for a vehicle should be proposed.

SUMMARY OF THE INVENTION

Embodiments of the application provide a lateral motion control method for a vehicle, a lateral motion control system for a vehicle, an automatic driving controller, a steering system, a vehicle, and a computer readable storage medium, which are used for controlling lateral motion of the vehicle.

According to an aspect of the application, provided is a lateral motion control method for a vehicle, comprising: generating and outputting a steering control command according to a desired track of the vehicle, such that the vehicle moves along an actual track according to the steering control command; determining a vehicle running state, wherein the vehicle running state is generated according to an error value between the desired track and the actual track; and determining whether to stop/limit outputting of the steering control command or not according to the vehicle running state.

In some embodiments of the application, optionally, determining the vehicle running state comprises: determining an acceptable steering torque range of the vehicle at a current vehicle speed on the basis of the error value.

In some embodiments of the application, optionally, the vehicle running state comprises at least one of: a variation trend of the error value; whether a current steering torque is within the acceptable steering torque range or not; and the time during which the current steering torque is beyond the acceptable steering torque range.

In some embodiments of the application, optionally, determining whether to stop/limit outputting of the steering control command or not according to the vehicle running state: stopping/limiting outputting of the steering control command in response to the error value having an increasing trend, the current steering torque being beyond the acceptable steering torque range, and/or the time during which the current steering torque is beyond the acceptable steering torque range exceeding a preset time.

In some embodiments of the application, optionally, if the continuous time during which the current steering torque is beyond the acceptable steering torque range reaches a time threshold value, determining that the time during which the current steering torque is beyond the acceptable steering torque range exceeds the preset time; and/or in the case of consecutive sampling of a predetermined number of times at predetermined time intervals, if the count percentage of the current steering torque being beyond the acceptable steering torque range exceeds a proportion threshold value, determining that the time during which the current steering torque is beyond the acceptable steering torque range exceeds the preset time.

According to another aspect of the application, provided is a lateral motion control system for a vehicle, comprising: a generation module configured to generate and output a steering control command according to a desired track of the vehicle, such that the vehicle moves along an actual track according to the steering control command; and a monitoring module configured to determine a vehicle running state, wherein the vehicle running state is generated according to an error value between the desired track and the actual track, and to determine whether to stop/limit the generating module to output the steering control command or not according to the vehicle running state.

In some embodiments of the application, optionally, the monitoring module is configured to: determine an acceptable steering torque range corresponding to the error value of the vehicle at a current vehicle speed on the basis of the error value.

In some embodiments of the application, optionally, the vehicle running state comprises at least one of: a variation trend of the error value; whether a current steering torque is within the acceptable steering torque range or not; and the time during which the current steering torque is beyond the acceptable steering torque range.

In some embodiments of the application, optionally, the monitoring module is configured to stop/limit outputting of the steering control command from the generating module in response to the error value having an increasing trend, the current steering torque being beyond the acceptable steering torque range, and/or the time during which the current steering torque is beyond the acceptable steering torque range exceeding a preset time.

In some embodiments of the application, optionally, the monitoring module is configured to: determine that the time during which the current steering torque is beyond the acceptable steering torque range exceeds the preset time if the continuous time during which the current steering torque is beyond the acceptable steering torque range reaches a time threshold value; and/or in the case of consecutive sampling of a predetermined number of times at predetermined time intervals, if the count percentage of the current steering torque being beyond the acceptable steering torque range exceeds a proportion threshold value, determining that the time during which the current steering torque is beyond the acceptable steering torque range exceeds the preset time.

According to another aspect of the application, provided is an automatic driving controller, comprising any one of the lateral motion control systems for the vehicle as described above.

According to another aspect of the application, provided is a steering system, comprising any one of the lateral motion control systems for the vehicle as described above, or any one of the automatic driving controllers as described above; and a steering actuator configured to receive and execute the steering control command.

According to another aspect of the application, provided is a vehicle, comprising any one of the lateral motion control systems for the vehicle as described above, or any one of the automatic driving controllers as described above, or any one of the steering systems as described above.

According to another aspect of this application, a computer-readable storage medium is provided, where the computer-readable storage medium stores instructions, and the instructions, when executed by a processor, cause the processor to perform any one of the foregoing methods.

BRIEF DESCRIPTION OF THE DRAWINGS

The above and other objectives and advantages of this application will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of this application are mainly described herein with reference to its exemplary embodiments. However, those skilled in the art can easily appreciate that the same principle can be equivalently applied to all types of lateral motion control methods for a vehicle, lateral motion control systems for a vehicle, automatic driving controllers, steering systems, vehicles, and computer-readable storage media, and a same or similar principle can be implemented. These variations do not depart from the true spirit and scope of the application.

A track in the context of the invention refers to a set of all locations of the vehicle as a mass point in an inertial coordinate system (not including time or velocity variables). For example, a desired track refers to a set of all locations of the vehicle as a mass point running in an inertial coordinate system, and an actual track refers to a set of all locations of the vehicle in actually running. In some scenarios, if the selection of the coordinate system does not affect computational complexity, various tracks may also be generated in other coordinate systems than the vehicle coordinate system, where practicable.

Figure 3:
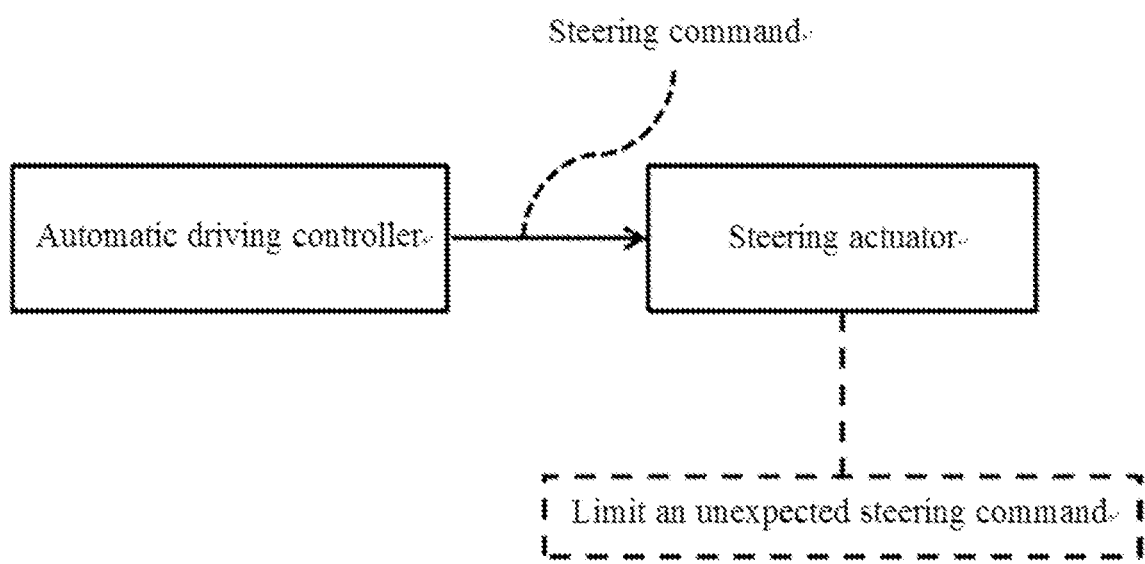
FIG. 3 shows the principle of lateral motion control for vehicle according to the prior art.

FIG. 3 shows the principle of lateral motion control for vehicle according to the prior art. Currently, in order for enabling a lateral motion control function such as automatic drive to meet the functional safety requirements of ASIL-D, the functional safety requirements of ASIL-D are typically assigned to a steering actuator for execution such that the steering actuator may limit a lateral drive torque/angle request magnitude and the rate of change of an automatic driving controller below a certain value. This way is sufficient for a low-level automatic driving function that allows the steering actuator to monitor the automatic driving controller. Even if the automatic driving controller issues an unexpected steering command, due to the limitation of the steering actuator on a steering command amplitude rate, it can also be ensured that the entire automatic driving function is not against the functional safety objective of the entire vehicle.

Although the steering actuator limits the lateral control input of the automatic driving controller, this way can only meet the performance requirements of the low-level automatic driving function. For a high-level automatic driving function, sometimes, there is also a need to remove the limitation of the steering actuator's request for the automatic driving controller due to the need to cope with more complex vehicle operation scenarios. This objective is inconsistent with the original intention of limiting the lateral control input of the automatic driving controller by using the steering actuator.

Figure 1:
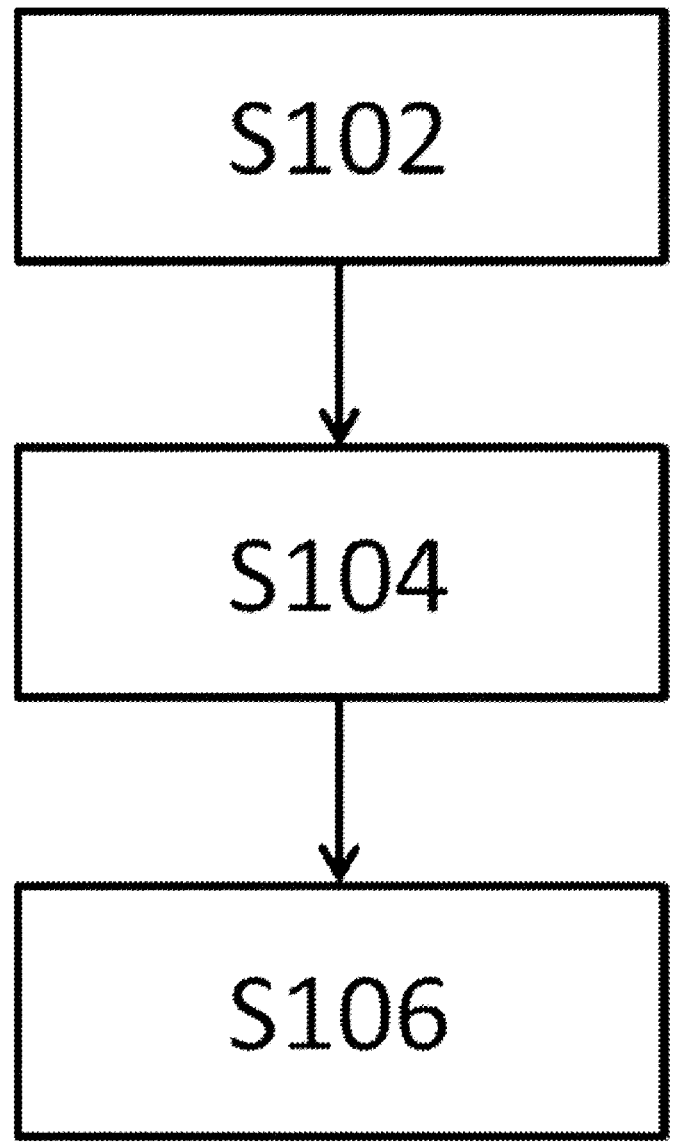
FIG. 1 shows a lateral motion control method for a vehicle according to an embodiment of the application.

According to an aspect of the application, provided is a lateral motion control method for a vehicle. As shown in FIG. 1, the lateral motion control method 10 for the vehicle (referred to simply as a method 10 or a process 10) comprises the following steps: in step S102, generating and outputting a steering control command according to a desired track of the vehicle, such that the vehicle moves along an actual track according to the steering control command; in step S104, determining a vehicle running state according to an error value between the desired track and the actual track; and in step S106, determining whether to stop/limit outputting of the steering control command or not according to the vehicle running state.

The method 10 generates and outputs the steering control command according to the desired track of the vehicle in step S102. In some examples of the application, the steering control command is generated on the basis of a steering demand that may result from the adjustment of a motion track. For example, with respect to the current track, the desired (motion) track is a desired vehicle driving track, and the vehicle may be driven to reach the desired track by means of a steering operation. For example, during automatic driving, a corresponding controller of the vehicle may continuously generate a control amount for achieving the desired track, such as the steering control command, by a control means (such as PID control and MPC control) according to a desired variable, a feedback variable, and a certain disturbance input. The control process of generating the steering control command is repeated continuously throughout the automatic driving process.

However, limited by the computational accuracy and the complexity of the vehicle's condition, even if the vehicle receives the steering control command that desires to drive the vehicle to the desired track and executes a steering operation according to the command, the vehicle may also not strictly advance according to the desired track, but may advance on a motion track that deviates from the desired track, which is referred to as an actual track in the context of the application. In other words, the steering control command is generated according to the desired track, but when the actuator on the vehicle actually executes the steering control command (due to an error of the actuator itself and disturbances present in the surrounding environment), the vehicle eventually follows an actual track that deviates from the desired track. In some examples of the invention, the working principle of determining whether the vehicle is at risk of becoming out of control (namely, being against a whole vehicle safety metric for lateral control of the vehicle) or not according to the desired track and the actual track will be described in detail below.

The method 10 determines the vehicle running state according to the error value between the desired track and the actual track in step S104. The vehicle is driven by the steering control command to run along the actual track, in some cases, the deviation between the actual track and the desired track may be so small as to be negligible; in other cases, the deviation between the actual track and the desired track may be so great as to affect vehicle control stability or even driving safety. The error value of the desired track and the actual track may be evaluated in step S104 to determine whether the vehicle running state generated according to the error value of the desired track and the actual track may affect the control stability or even the driving safety, and an active safety measure may be taken according to an evaluation result in the following step.

The method 10 determines whether to stop/limit outputting of the steering control command or not according to the vehicle running state in step S106. For example, when the vehicle running state is sufficient to affect control or even driving safety, the outputting of the steering control command may be stopped or limited; otherwise, the steering control command may continue to be output. In some examples, if the outputting of the steering control command is stopped during automatic driving, a reminder may be sent to a driver such that the driver takes over the vehicle. In some examples, the outputting of the steering control command may be limited, for example, the magnitude, rate of change, etc. of a steering torque/steering angle in the steering control command may be limited below a predetermined value. In some examples, after the outputting of the steering control command is stopped or limited, the vehicle may be parked in a safe state according to an established program.

In some embodiments of the application, an acceptable steering torque range corresponding to the error value of the vehicle at a current vehicle speed is also determined in step S104, and the vehicle running state is further determined according to the error value and/or the acceptable steering torque range.

In some examples, the error value of the desired track and the actual track is a distance value, for example, a few centimeters. In this case, the error value may be used to measure the vehicle running state. In some examples, the acceptable steering torque range of the vehicle at the current vehicle speed may also be determined according to the error value. In general, the error value may cause that the vehicle is at risk of becoming out of control, and the uncontrolled degree varies as the current speed of the vehicle varies. In some examples, the relative relationship of the error value, the current vehicle speed and the acceptable steering torque range of the vehicle may be calibrated according to the safety metric of the whole vehicle, which may include a limit value for lateral acceleration. The above calibration process may be completed in advance in an off-line manner, and a calibration result may be stored in a table form. The stored table may be invoked in use, for example, the acceptable steering torque range of the vehicle may be derived by looking up the table according to the error value of the desired track and the actual track of the vehicle and the current vehicle speed.

In some embodiments of the application, the vehicle running state includes at least one of: a variation trend in the error value (for example, the error becomes larger or smaller); whether a current steering torque is within the acceptable steering torque range or not; and the time during which the current steering torque is beyond the acceptable steering torque range.

In some embodiments of the application, the outputting of the steering control command may be stopped/limited in step S106 in response to an increasing trend in the error value (one of the indications that the vehicle is at risk of becoming out of control), the current steering torque being beyond the acceptable steering torque range (one of the indications that the vehicle is at risk of becoming out of control) and/or the time during which the current steering torque is beyond the acceptable steering torque range exceeding the preset time (one of the indications that the vehicle is at risk of becoming out of control); otherwise, the steering control command may continue to be output. At least one of the above three criteria for evaluating the representations that the vehicle is at risk of becoming out of control may be selected as desired for implementation.

In some embodiments of the application, if the continuous time during which the current steering torque is beyond the acceptable steering torque range (greater than its upper limit or less than its lower limit) reaches a time threshold value $T_{th}$, it is determined that the time during which the current steering torque is beyond the acceptable steering torque range exceeds the preset time (which may also be referred to be greater than the preset time). This process is also known as a sliding time window measurement method. For example, if it is recorded that the current steering torque is beyond the acceptable steering torque range at a moment $t_1$, and it is also recorded that the current steering torque is still beyond the acceptable steering torque range until a moment $t_2$, which is $T_{th}$ from the moment $t_1$, it may be determined that the time during which the current steering torque is beyond the acceptable steering torque range exceeds the preset time ($T_{th}$), and it may be further determined that the vehicle is at risk of becoming out of control.

In some embodiments of the application, in the case of consecutive sampling of a predetermined number of times at predetermined time intervals, if the count percentage of the current steering torque being beyond the acceptable steering torque range exceeds a proportion threshold value, it is determined that the time during which the current steering torque is beyond the acceptable steering torque range exceeds the preset time. Sometimes, continuously examination of the steering torque over a period of time has the high requirement for data processing. In this case, a sampling method may be used to presume whether or not the time during which the current steering torque is beyond the acceptable steering torque range exceeds the preset time. For example, N consecutive sampling may be performed at predetermined time intervals $\Delta t$ (for example, N=20), and if the acquired data indicates that the count percentage of the current steering torque being beyond the acceptable steering torque range is more than 75% (for example, 0.75*N=15), it is assumed that the current steering torque is beyond the acceptable steering torque range within the time range (preset time) of $\Delta t*(N-1)$, and it may be further determined that the vehicle is at risk of becoming out of control.

The above two manners of determining whether the time during which the current steering torque is beyond the acceptable steering torque range exceeds the preset time or not may be used alternatively or in combination.

Figure 2:
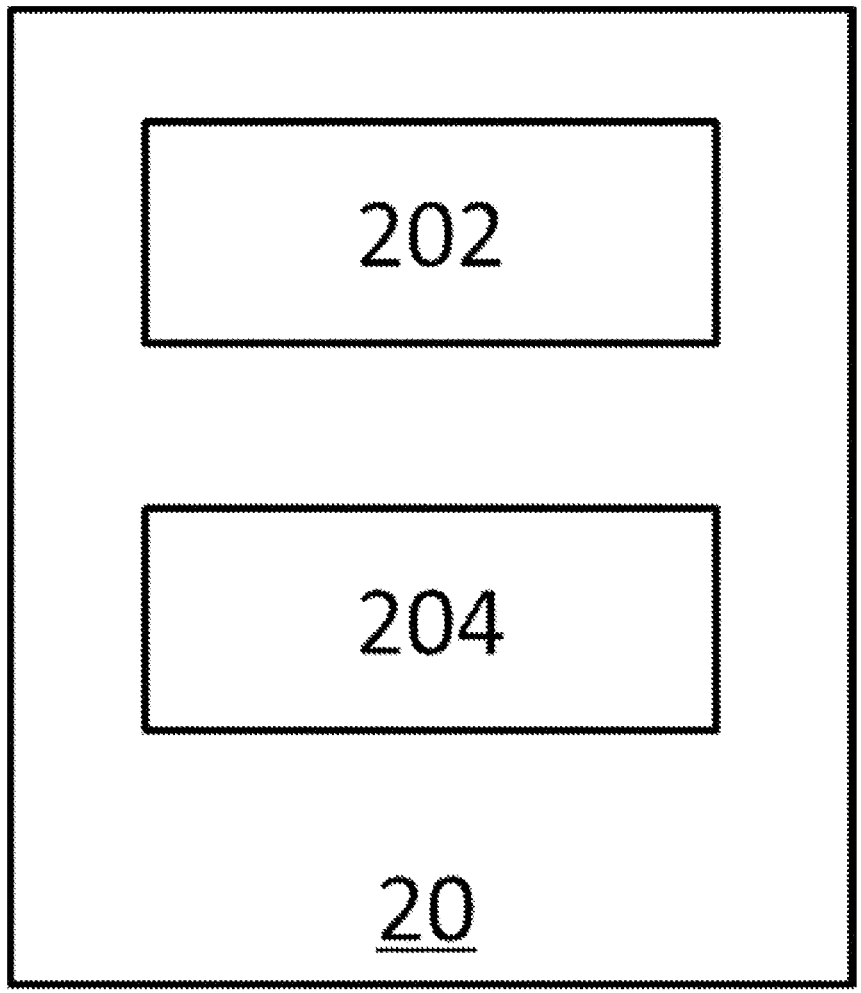
FIG. 2 shows a lateral motion control system for a vehicle according to an embodiment of the application.

According to another aspect of the application, provided is a lateral motion control system for a vehicle. As shown in FIG. 2, the lateral motion control system 20 for the vehicle (referred to simply as a system 20) comprises a generation module 202 and a monitoring module 204.

The generation module 202 of the system 20 is configured to generate and output a steering control command according to a desired track of the vehicle. In some examples of the application, the steering control command is generated on the basis of a steering demand that may result from the adjustment of a motion track. For example, with respect to the current track, the desired (motion) track is a desired vehicle driving track, and the vehicle may be driven to reach the desired track by means of a steering operation. However, limited by the computational accuracy and the complexity of the vehicle's condition, even if the vehicle receives the steering control command that desires to drive the vehicle to the desired track and executes a steering operation according to the command, the vehicle may also not strictly advance according to the desired track, but may advance on a motion track that deviates from the desired track, which is referred to as an actual track in the context of the application. In other words, the steering control command is generated according to the desired track, but when the steering control command is actually executed, the vehicle is driven to the actual track. In some practices of the invention, the working principle of determining whether the vehicle is at risk of becoming out of control (namely, being against a whole vehicle safety metric for lateral control of the vehicle) or not according to the desired track and the actual track will be described in detail below.

The monitoring module 204 of the system 20 is configured to generate a vehicle running state according to the error value of the desired track and the actual track, and to determine whether to stop/limit the generating module 202 to output a steering control command according to the vehicle running state. The vehicle is driven by the steering control command to run along the actual track, in some cases, the deviation between the actual track and the desired track may be so small as to be negligible; In other cases, the deviation between the actual track and the desired track may be so great as to affect vehicle handling or even driving safety. The monitoring module 204 may evaluate the error value of the desired track and the actual track to determine whether the vehicle running state generated according to the error value of the desired track and the actual track may affect the control or even the driving safety, and an active safety measure may be taken according to an evaluation result in the following step.

For example, the monitoring module 204 may stop or limit the outputting of the steering control command when the vehicle running state is sufficient to affect control or even driving safety; otherwise, the steering control command may continue to be output. In some examples, if the outputting of the steering control command is stopped during automatic driving, a reminder may be sent to a driver such that the driver takes over the vehicle. In some examples, the outputting of the steering control command may be limited, for example, the magnitude, rate of change, etc. of a steering torque/steering angle in the steering control command may be limited below a predetermined value. In some examples, after the outputting of the steering control command is stopped or limited, the vehicle may be parked in a safe state according to an established program.

In some embodiments of the application, the monitoring module 204 is configured to determine an acceptable steering torque range corresponding to the error value of the vehicle at the current vehicle speed, and the monitoring module 204 is configured to further determine the vehicle running state according to the error value and/or the acceptable steering torque range.

In some examples, the error value of the desired track and the actual track is a distance value, for example, a few centimeters. In this case, the error value may be used to measure the vehicle running state. In some examples, the acceptable steering torque range of the vehicle at the current vehicle speed may also be determined according to the error value. In general, the error value may cause that the vehicle is at risk of becoming out of control, and the uncontrolled degree varies as the current speed of the vehicle varies. In some examples, the relative relationship of the error value, the current vehicle speed and the acceptable steering torque range of the vehicle may be calibrated according to the safety metric of the whole vehicle, which may include a limit value for lateral acceleration. The above calibration process may be completed in advance in an off-line manner, and a calibration result may be stored in a table form. The stored table may be invoked in use, for example, the acceptable steering torque range of the vehicle may be derived according to the error value of the desired track and the actual track of the vehicle and the current vehicle speed.

In some embodiments of the application, the vehicle running state includes at least one of: a variation trend in the error value (for example, the error becomes larger or smaller); whether a current steering torque is within the acceptable steering torque range or not; and the time during which the current steering torque is beyond the acceptable steering torque range.

In some embodiments of the application, the monitoring module 204 is configured to stop/limit outputting of the steering control command from the generation module 202 in response to an increasing trend in the error value (one of the indications that the vehicle is at risk of becoming out of control), the current steering torque being beyond the acceptable steering torque range (one of the indications that the vehicle is at risk of becoming out of control) and/or the time during which the current steering torque is beyond the acceptable steering torque range exceeding the preset time (one of the indications that the vehicle is at risk of becoming out of control); otherwise, the steering control command may continue to be output. The monitoring module 204 may select at least one of the above three criteria for evaluating the representations that the vehicle is at risk of becoming out of control for implementation.

In some embodiments of the application, the monitoring module 204 is configured to determine that the time during which the current steering torque is beyond the acceptable steering torque range exceeds the preset time in the case where the continuous time during which the current steering torque is beyond the acceptable steering torque range (greater than its upper limit or less than its lower limit) reaches a time threshold value $T_{th}$. This process is also known as a sliding time window measurement method. For example, if the monitoring module 204 records that the current steering torque is out of the acceptable steering torque range at a moment $t_1$, and records that the current steering torque is still beyond the acceptable steering torque range until a moment $t_2$, which is $T_{th}$ from the moment $t_1$, it may be determined that the time during which the current steering torque is beyond the acceptable steering torque range exceeds the preset time ($T_{th}$), and it may be further determined that the vehicle is at risk of becoming out of control.

The monitoring module 204 may also be configured to determine, in the case of consecutive sampling of a predetermined number of times at predetermined time intervals, that the time during which the current steering torque is beyond the acceptable steering torque range exceeds the preset time if the count percentage of the current steering torque being beyond the acceptable steering torque range exceeds a proportion threshold value. Sometimes, continuously examination of the steering torque over a period of time has the high requirement for data processing. In this case, a sampling method may be used to presume whether or not the time during which the current steering torque is beyond the acceptable steering torque range exceeds the preset time. For example, the monitoring module 204 may perform N consecutive sampling at predetermined time intervals $\Delta t$ (for example, N=20), and if the data acquired by the monitoring module 204 indicates that the count percentage of the current steering torque being beyond the acceptable steering torque range is more than 75% (for example, 0.75*N=15), it is assumed that the current steering torque is beyond the acceptable steering torque range within the time range (preset time) of $\Delta t^{*}(N-1)$, and it may be further determined that the vehicle is at risk of becoming out of control.

The above two manners of determining whether the time during which the current steering torque is beyond the acceptable steering torque range exceeds the preset time or not may be used alternatively or in combination.

According to another aspect of the application, provided is an automatic driving controller, comprising any one of the lateral motion control systems for the vehicle as described above.

According to another aspect of the application, provided is a steering system, comprising any one of the lateral motion control systems for the vehicle as described above, or any one of the automatic driving controllers as described above; and a steering actuator configured to receive and execute the steering control command.

According to another aspect of the application, provided is a vehicle, comprising any one of the lateral motion control systems for the vehicle as described above, or any one of the automatic driving controllers as described above, or any one of the steering systems as described above.

According to another aspect of the application, a computer-readable storage medium is provided, in which instructions are stored, and when the instructions are executed by a processor, the processor is enabled to execute any one of the lateral motion control methods for the vehicle as described above. The computer-readable medium in this application includes various types of computer storage media, and may be any usable medium accessible to a general-purpose or special-purpose computer. For example, the computer-readable medium may include a RAM, a ROM, an EPROM, an E²PROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used herein, while data is usually copied optically by using lasers in a disc. A combination thereof shall also fall within the scope of protection of the computer-readable media. For example, the storage medium is coupled to a processor, so that the processor can read information from and write information to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing descriptions are merely the embodiments of this application, but are not intended to limit the protection scope of this application. Any feasible variation or replacement conceived by a person skilled in the art within the technical scope disclosed in this application shall fall within the scope of protection of this application. In the case of no conflict, the embodiments of this application and features in the embodiments may also be combined with each another. The scope of protection of this application shall be subject to recitations of the claims.

What is claimed is:

1. A lateral motion control method for a vehicle, comprising:
   generating and outputting a steering control command according to a desired track of the vehicle, such that the vehicle moves along an actual track according to the steering control command;
   determining a vehicle running state, wherein determining a vehicle running state comprises:
      determining an acceptable steering torque range of the vehicle at a current vehicle speed, by looking up a table, on the basis of an error value between the desired track and the actual track, wherein the table includes a calibration result of a relative relationship of the error value, the current vehicle speed, and the acceptable steering torque range according to a limit value for lateral acceleration; and
      determining the vehicle running state based on the error value and the acceptable steering torque range; and
   determining whether to stop/limit outputting of the steering control command or not according to the vehicle running state for avoiding the risk of the vehicle's out of control.

2. The method of claim 1, wherein the vehicle running state comprises at least one of:
   a variation trend of the error value;
   whether a current steering torque is within the acceptable steering torque range or not; and
   the time during which the current steering torque is beyond the acceptable steering torque range.

3. The method of claim 2, wherein determining whether to stop/limit outputting of the steering control command or not according to the vehicle running state comprises:
   stopping/limiting outputting of the steering control command in response to the error value having an increasing trend, the current steering torque being beyond the acceptable steering torque range, and/or the time during which the current steering torque is beyond the acceptable steering torque range exceeding a preset time.

4. The method of claim 3, wherein determining that the time during which the current steering torque is beyond the acceptable steering torque range exceeds the preset time if the continuous time during which the current steering torque is beyond the acceptable steering torque range reaches a time threshold value; and/or
   in the case of consecutive sampling of a predetermined number of times at predetermined time intervals, if the count percentage of the current steering torque being beyond the acceptable steering torque range exceeds a proportion threshold value, determining that the time during which the current steering torque is beyond the acceptable steering torque range exceeds the preset time.

5. A lateral motion control system for a vehicle, comprising:
a memory configured to store instructions; and
a processor configured to execute the instructions to cause the lateral motion control system to:
generate a steering control command according to a desired track of the vehicle, such that the vehicle moves along an actual track according to the steering control command;
determine a vehicle running state, wherein determining a vehicle running state comprises:
determining an acceptable steering torque range of the vehicle at a current vehicle speed, by looking up a table, on the basis of an error value between the desired track and the actual track, wherein the table includes a calibration result of a relative relationship of the error value, the current vehicle speed, and the acceptable steering torque range according to a limit value for lateral acceleration; and
determining the vehicle running state based on the error value and the acceptable steering torque range; and
determine whether to stop/limit outputting of the steering control command according to the vehicle running state for avoiding the risk of the vehicle's out of control.

6. The system of claim 5, wherein the vehicle running state comprises at least one of:
a variation trend of the error value;
whether a current steering torque is within the acceptable steering torque range or not; and
the time during which the current steering torque is beyond the acceptable steering torque range.

7. The system of claim 6, wherein the processor further configured to execute the instructions to cause the lateral motion control system to: stop/limit outputting of the steering control command in response to the error value having an increasing trend, the current steering torque being beyond the acceptable steering torque range, and/or the time during which the current steering torque is beyond the acceptable steering torque range exceeding a preset time.

8. The system of claim 7, wherein the processor further configured to execute the instructions to cause the lateral motion control system to:
determine that the time during which the current steering torque is beyond the acceptable steering torque range exceeds the preset time if the continuous time during which the current steering torque is beyond the acceptable steering torque range reaches a time threshold value; and/or
in the case of consecutive sampling of a predetermined number of times at predetermined time intervals, if the count percentage of the current steering torque being beyond the acceptable steering torque range exceeds a proportion threshold value, determining that the time during which the current steering torque is beyond the acceptable steering torque range exceeds the preset time.

9. A vehicle, comprising the lateral motion control system for a vehicle of claim 5.

* * * * *